United States Patent [19]
Entenmann et al.

[11] Patent Number: 5,645,034
[45] Date of Patent: Jul. 8, 1997

[54] METHOD FOR THE ADAPTIVE KNOCK CONTROL OF AN INTERNAL COMBUSTION ENGINE

[75] Inventors: Robert Entenmann, Benningen; Stefan Unland; Oskar Torno, both of Schwieberdingen; Werner Haeming, Neudenau-Herboldzheim; Ulrich Rothhaar, Stuttgart; Iwan Surjadi, Vaihingen/Enz; Wolfgang Hilbert, Moeglingen; Robert Sloboda, Markgroeningen; Michael Baeuerle, Besigheim-Ottmarsheim; Klaus Schenk, Bietigheim-Bissingen, all of Germany

[73] Assignee: Robert Bosch GmbH, Stuttgart, Germany

[21] Appl. No.: 481,407

[22] PCT Filed: Dec. 4, 1993

[86] PCT No.: PCT/DE93/01154

§ 371 Date: Sep. 1, 1995

§ 102(e) Date: Sep. 1, 1995

[87] PCT Pub. No.: WO94/16213

PCT Pub. Date: Jul. 21, 1994

[30] Foreign Application Priority Data

Jan. 9, 1993 [DE] Germany .................. 43 00 406.7

[51] Int. Cl.⁶ .......................................... F02P 5/15
[52] U.S. Cl. .......................................... 123/425
[58] Field of Search ........................ 123/425, 435

[56] References Cited

U.S. PATENT DOCUMENTS

| | | | |
|---|---|---|---|
| 4,527,526 | 7/1985 | Akasu | 123/425 |
| 4,617,895 | 10/1986 | Sakakibara et al. | 123/425 |
| 4,699,105 | 10/1987 | Jensen | 123/425 |
| 5,243,942 | 9/1993 | Entenmann et al. | 123/425 |

FOREIGN PATENT DOCUMENTS

| | | |
|---|---|---|
| WO89/12746 | 12/1989 | WIPO. |
| WO91/10829 | 7/1991 | WIPO. |
| WO92/16740 | 10/1992 | WIPO. |

*Primary Examiner*—Tony M. Argenbright
*Attorney, Agent, or Firm*—Kenyon & Kenyon

[57] ABSTRACT

A method for the adaptive knock control of an internal combustion engine serves for shifting the ignition angle of an internal combustion engine in the retard direction when knocking occurs and for subsequently carrying out a return of the ignition angle in the advance direction. At the same time, the internal combustion engine is to have sub-divided operating ranges, and a value of an ignition-angle retard, determined in a range during operation, is always stored when this range is left. At the same time, in particular an average of all the ignition angles outputted in a range or a retard value plotted by a digital low-pass filter is to be stored.

6 Claims, 1 Drawing Sheet

5,645,034

METHOD FOR THE ADAPTIVE KNOCK CONTROL OF AN INTERNAL COMBUSTION ENGINE

BACKGROUND INFORMATION

A knock control is already known from German Patent Application No. 40 08 170, and in this the ignition angle is set by means of a characteristic diagram and, when knocking occurs, the ignition angle is retarded in order to prevent this knocking. Subsequently, this ignition angle is brought to the ignition angle of the characteristic diagram again by a return in steps in the direction of advance. Furthermore, the operating range of an internal combustion engine is subdivided into different ranges, so that, when a range is left, the ignition angle current at that moment is stored and, when the internal combustion engine is operated once more in this range, this stored ignition angle is outputted as a starting value. Now in the event of a change of range, the previously stored ignition angle may differ from the optimum ignition angle, so that, in the state of the art, the return of the ignition angle is carried out at increased speed. However, particularly when there is a large difference between the stored ignition angle and the optimum ignition angle guaranteeing operation near the knock limit, this method has the disadvantage that torque jumps detectable on the engine occur as a result of the ignition-angle jumps.

SUMMARY OF THE INVENTION

An advantage of the method according to the present invention is that the above-described ignition-angle jumps are reduced and therefore no detectable torque jumps occur on the engine. It is to be considered a further advantage that the exhaust-gas behavior of the engine is improved by the avoidance of unfavorable ignition angles. Furthermore, it is advantageous, for averaging, to employ all the ignition-angle retard values or the initial and final value of the ignition-angle retard values which are outputted in this range. However, the formation of a geometrical, quadratic or harmonic average of all the ignition-angle retard values of a range is also possible. Finally, it is advantageous to provide an ignition-angle change limitation, so that, when this ignition-angle change limitation is exceeded during the change from one operating range to another, the current ignition angle is brought to the stored ignition angle at increased speed, with the result that torque jumps are avoided.

This ignition-angle change limitation does not take effect when knocking occurs, so that, in the event of knocking, a sufficient ignition-angle shift takes place in any case for knock-free operation. It may also be mentioned that the adaption of the ignition angle, if the stored ignition angle deviates from the current ignition angle by less than a predeterminable difference amount, the step width and the step height of the ignition-angle return can be changed over to another set of parameters with slower control, so that a slower torque change and therefore a quiet running of the internal combustion engine are possible.

DETAILED DESCRIPTION

Figure 1:
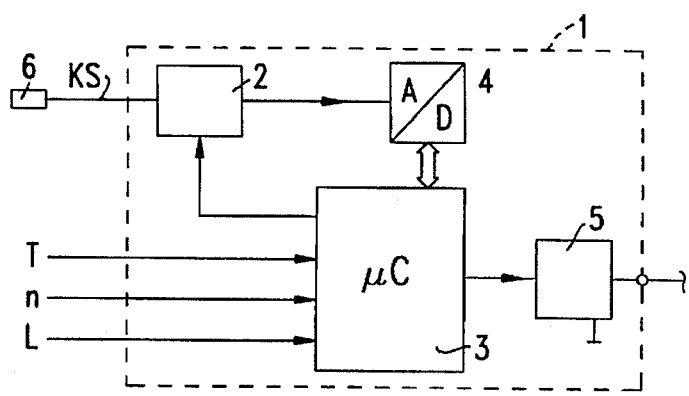
FIG. 1 shows a block diagram for carrying out the method of adaptive knock control according to the present invention.
Figure 2:
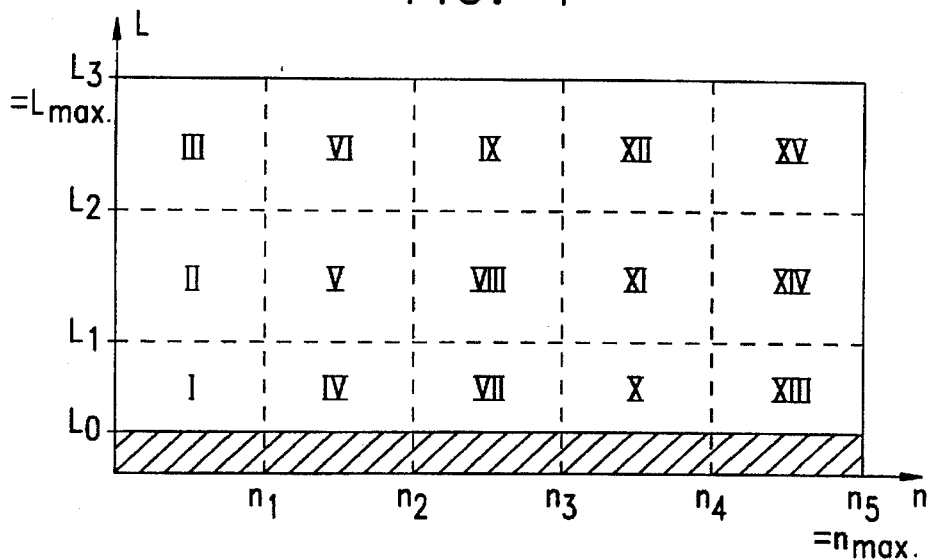
FIG. 2 shows an adaption characteristic diagram according to the present invention.

FIG. 1 shows a block diagram for carrying out the method of adaptive knock control. The internal combustion engine (not shown) is operated by means of a control unit 1 which has a knock-sensor evaluation circuit 2, a microprocessor 3, an analog/digital converter 4 and an ignition output stage 5. On the engine block of the internal combustion engine there are one or more knock sensors 6 which are connected to the knock-sensor evaluation circuit 2. The knock-sensor evaluation circuit 2 is connected to the microprocessor 3 via an analog/digital converter 4. Furthermore, the recorded parameters of the internal combustion engine are fed to the microprocessor 3. Thus, for example, the load L which is determined, for example, from the throttle-flap angle position or the intake-pipe pressure, the engine speed n and the temperature T are supplied to the microprocessor. The knock signal KS, recorded by the knock sensor and representing the engine noises, is fed to the knock-sensor evaluation circuit 2. This evaluation circuit 2, for example by a comparison with a reference value, determines whether knocking K has occurred. If knocking K has occurred, a shift of the ignition angle in the retard direction and a subsequent return of the ignition angle in the advance direction take place, this corresponding to an approximation to the ignition angle outputted by the characteristic diagram. This knock control together with the ignition-angle shift necessary for the purpose is carried out by the microprocessor 3. This microprocessor 3 in each case computes from the existing operating parameters a characteristic-diagram ignition angle which, after knocking occurs, is subjected to an adaptive ignition-angle shift $\alpha$. An adaption characteristic diagram, as shown in FIG. 2, is stored in the microprocessor 3. This adaption characteristic diagram is subdivided into individual operating ranges as a function of the load L and of the engine speed n. A detailed description of this adaption characteristic diagram is provided in, for example, German Application No. 40 08 170.

Figure 3:
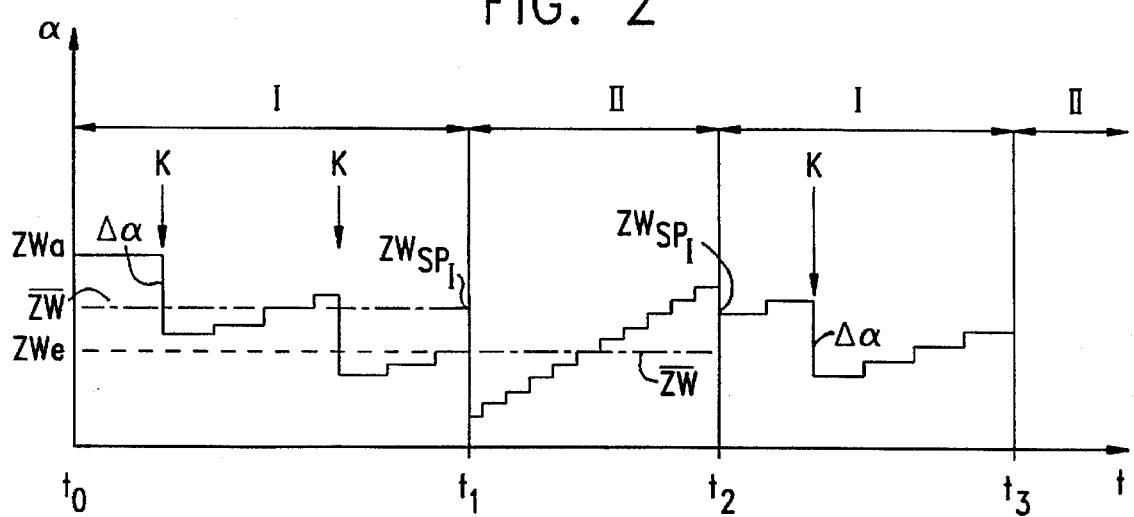
FIG. 3 illustrates the variation in the ignition angle in the method according to the present invention.

The flow of the method according to the present invention for knock control will be explained in more detail with reference to FIG. 3. At the time point t0, an internal combustion engine begins to work in the operating range I. Thus, on the basis of the current operating parameters, the control unit outputs an ignition angle $\alpha_{KF}$, that is to say the ignition angle is determined from a characteristic diagram which is mapped, for example, according to engine speed n and load L. During operation in the operating range I, knocking K is detected. A shift of the ignition angle by $\Delta\alpha$ in the retard direction consequently takes place. Subsequently, a return of the ignition angle in steps in the advance direction occurs, with the result that an approximation to the characteristic-diagram ignition angle is to be achieved. This return takes place until renewed knocking K occurs or until the characteristic-diagram ignition angle is reached. In the exemplary embodiment according to FIG. 3, further knocking K occurs during operation in the range I, with the result that a renewed retarding of the ignition angle takes place. At the time point t1, a change of range occurs in the internal combustion engine, that is to say, for example, a change from the operating range I to the operating range II. When the operating range I is left, an ignition angle $ZW_{SP}$ for this operating range is filed in a memory of the microprocessor 3 and, when this operating range is approached again, is provided as a starting value for the ignition. In this case, in contrast to the previous method, the last outputted ignition angle ZWe is not stored, but instead an ignition-angle retard value representing operation in this characteristic-diagram range, for example the arithmetic average or a retard value plotted by means of a low-pass filter $ZW_{SP,new}=(1-1/N)\cdot ZW_{SP,new}+1/N\times\Delta\alpha_{z,current}$ is stored for this operating range where:

N is an engine speed, $ZW_{SP,new}$ is an ignition angle for a new range, and $\Delta\alpha_{z,current}$ is a change in the adaptive ignition angle shift.

Similarly, to the storage of the arithmetic average angle retard values $\bar{x} = 1/n \sum_{i=1}^{n} x_i$, the geometric average retard values $\bar{x} = \sqrt[n]{\prod_{i=1}^{n}(\pi x_i)}$, the quadratic average angle retard values $\bar{x} = \sqrt[2]{\left(\left(\sum_{i=1}^{n} x_i^2\right) \ln\right)}$ or the harmonic average $$\bar{x} = \frac{n}{\sum_{i=1}^{n}\frac{1}{x_i}}$$

during operation in a range,
where, $x_i$ represents angle values, and n represents engine speed. can, when this range is left, be stored as a starting value for a renewed change to this range. In the event of a renewed approach of the operating range at the time point t2, this stored ignition angle $ZW_{SP}$ is outputted as a starting value and is adapted in steps in the advance direction of the ignition angle. When knocking K occurs again, once more a shift of the ignition angle in the retard direction takes place and is subsequently varied in steps in the advance direction.

Should a pronounced ignition-angle jump occur during the change from one characteristic-diagram range to another in spite of the above-described computation of the stored retard value, then, by means of an ignition-angle change limitation, this jump is not executed in one step, but in a plurality of steps. Detectable torque jumps can be avoided in this way. This ignition-angle change limitation does not take effect in the event of an ignition-angle retard due to knocking which occurs.

We claim:

1. A method for an adaptive knock control of an internal combustion engine, comprising the steps of:

selecting an ignition angle for operating the engine from a characteristic diagram as a function of at least one recorded operating parameter of the engine;

retarding the ignition angle in a cylinder of the engine when knocking occurs in the cylinder;

subsequently returning the ignition angle toward the characteristic-diagram ignition angle when no knocking occurs;

subdividing an operating range of the engine into a plurality of operating sub-ranges as a function of the at least one operating parameter;

forming and storing an updated value of the ignition angle associated with an operating sub-range, when the engine leaves the operating sub-range, as a function of a current value of the ignition angle and of past values of the ignition angle during engine operation in the operating sub-range;

if the engine returns to the operating sub-range, outputting the updated value of the ignition angle as an initial ignition value for operation of the engine;

returning the initial ignition value toward the characteristic-diagram ignition angle when no knocking occurs;

activating an ignition-angle-change threshold when the engine changes from a first operating sub-range to a second operating sub-range; and if the ignition-angle-change threshold is exceeded, altering the updated value of the ignition angle for the first operating sub-range to a stored ignition angle value for the second operating sub-range, the updated value of the ignition angle being altered in a plurality of steps.

2. The method according to claim 1, wherein the updated value of the ignition angle is formed in accordance with a functioning of a low pass filter and with the equation:

$$ZW_{SP,new}=(1-1/N)\cdot ZW_{SP,new}+1/N\Delta\alpha_{z,current},$$

N being an engine speed, $ZW_{SP,new}$ being the ignition angle for a new range, and $\Delta\alpha_{z,current}$ being a change in the adaptive ignition angle shift.

3. The method according to claim 1, wherein the updated value of the ignition angle is an arithmetic average of n past values of the ignition angle and is calculated in accordance with the equation:

$$\bar{x} = 1/n \sum_{i=1}^{n} x_i,$$

$x_i$ being a current angle value.

4. The method according to claim 1, wherein the updated value of the ignition angle is a geometric average of n past values of the ignition angle and is calculated in accordance with the equation:

$$\bar{x} = \sqrt[n]{\prod_{i=1}^{n} \pi x_i},$$

$x_i$ being a current angle value.

5. The method according to claim 1, wherein the updated value of the ignition angle is a quadratic average of n past values of the ignition angle and is calculated in accordance with the equation:

$$\bar{x} = \sqrt[2]{\left(\sum_{i=1}^{n} x_i^2\right)/n},$$

$x_i$ being a current angle value.

6. The method according to claim 1, wherein the updated value of the ignition angle is a harmonic average of n past values of the ignition angle and is calculated in accordance with the equation:

$$\bar{x} = \frac{n}{\sum_{i=1}^{n}\frac{1}{x_i}},$$

$x_i$ being a current angle value.

* * * * *

UNITED STATES PATENT AND TRADEMARK OFFICE
CERTIFICATE OF CORRECTION

PATENT No. : 5,645,034

DATED : July 8, 1997

INVENTOR(S): Robert Entenmann et al.

It is certified that error appears in the above-identified patent and that said Letters Patent is hereby corrected as shown below:

Column 3, line 16, "In" should be --/n--.

Signed and Sealed this

Twenty-seventh Day of January, 1998

*Attest:*

BRUCE LEHMAN

*Attesting Officer*    *Commissioner of Patents and Trademarks*